United States Patent [19]

Kohama et al.

[11] Patent Number: 4,818,012
[45] Date of Patent: Apr. 4, 1989

[54] BODY COVERS FOR MOTORCYCLE

[75] Inventors: Mitsuyoshi Kohama, Kiyose; Tetsuo Ogishima, Wako, both of Japan

[73] Assignee: Honda Giken Kogyo Kabushiki Kaisha, Tokyo, Japan

[21] Appl. No.: 107,718

[22] PCT Filed: Jan. 21, 1987

[86] PCT No.: PCT/JP87/00035
§ 371 Date: Nov. 18, 1987
§ 102(e) Date: Nov. 18, 1987

[87] PCT Pub. No.: WO87/04398
PCT Pub. Date: Jul. 30, 1987

[30] Foreign Application Priority Data

Jan. 27, 1986 [JP] Japan .................. 61-013742

[51] Int. Cl.[4] .................. B62J 17/02; B60K 11/06
[52] U.S. Cl. .................. 296/78.1; 180/68.1
[58] Field of Search .................. 296/78.1; 280/289 S; 180/68.1, 68.2

[56] References Cited

U.S. PATENT DOCUMENTS

| 902,592 | 11/1908 | Maughan | 180/68.1 |
|---|---|---|---|
| 4,411,333 | 10/1983 | Bothwell | 296/78.1 X |
| 4,678,223 | 7/1987 | Kisrii et al. | 296/78.1 |
| 4,685,530 | 8/1987 | Hara | 296/78.1 X |

FOREIGN PATENT DOCUMENTS

| 513213 | 2/1921 | France | 296/78.1 |
|---|---|---|---|
| 60-67280 | 4/1985 | Japan . | |
| 146771 | 8/1985 | Japan . | |
| 61-27772 | 2/1986 | Japan . | |
| 61-67285 | 5/1986 | Japan . | |
| 111892 | 9/1944 | Sweden | 180/68.1 |
| 187670 | 10/1922 | United Kingdom | 296/78.1 |
| 1537233 | 12/1978 | United Kingdom | 296/78.1 |
| 1604636 | 12/1981 | United Kingdom . | |

Primary Examiner—Dennis H. Pedder
Attorney, Agent, or Firm—Armstrong, Nikaido, Marmelstein & Kubovcik

[57] ABSTRACT

A body cover for a motorcycle having a body frame including a front cover extending around and covering a front part of the body frame from the front to a left and a right side thereof, the front cover having an opening at each side with each opening providing access to an engine, a pair of side covers with each side cover adapted to be removably attached to cover an opening at one side of the front cover and each of the side covers being formed to provide an outer surface which is a smooth continuation of an adjacent outer surface of the front cover. A second part of each side cover gradually inclines toward the body frame and a rear part extends along the side of the body frame under the seat. Each of the side covers extends from the front to the rear of the main frame member and covers one side of the main frame member, back stay and seat rail.

3 Claims, 3 Drawing Sheets

BODY COVERS FOR MOTORCYCLE

TECHNICAL FIELD

This invention relates to a body cover for covering all over a front and both right and left sides of the body frame of a motorcycle.

BACKGROUND ART

Some motorcycles are of the type in that a front part of a motorcycle body frame is covered with a front cowling from the front to both right and left sides so as to minimize air disturbance caused by car running, thereby to reduce running resistance. The front cowling is provided on the front with a cooling air inlet port so that an engine mounted inside the front cowling is cooled by running air flowing from the inlet port.

Japanese Patent Early Laid-open Publication No. 60-146771 discloses a body cover for such motorcycles, wherein both right and left frame covers 01 and 01' with front parts thereof bent outwards generally in a U-shape, as shown in FIG. 1, are mounted on an under side of a seat 02 and with the outsides of front ends thereof held in alingment with a rear edge 04 or 04' of a front cowling 03, thereby to prevent a leg portion of a rider from hot air which has just finished its task for cooling an engine 06.

In such motorcycles as described, however, the rear edge 04 of the front cowling 03 is situated at a part where the leg of the rider who sits astride the seat 02, is abutted and thus undesirable. Moreover, cooling air flowing backwards passing through the engine 06, receives resistance from the portion 05 of the front end of the frame covers 01 and 01' which is bent generally in a U-shape. Furthermore, running air flowing along the outside of the front cowling 03, is disturbed at a portion where the outside of the front cowling 03 is discontinued at the rear edges 04 and 04' thereby to increase air resistance. In addition, in such motorcycles as mentioned, the whole front cowling 03 must be removed from the body when a maintenance is performed on the engine.

DISCLOSURE OF INVENTION

Under the circumstances as mentioned, a body cover for a motorcycle body frame of the present invention comprises a front cover for covering a front part of the motorcycle body frame from the front to both sides thereof and having openings on both sides thereof facing an engine, and right and left covers removably attached to the sides of the front cover and covering the openings, the right and left covers being gradually bent toward the center line of the body frame from the front toward the rear and then extending under a seat and along the sides toward the rear of the motorcycle.

According to the present invention, the side covers for covering the openings provided in the front cover continue to a portion under the seat which is held between the legs of a rider through the gently bent surfaces. Thus, comfortable riding is obtainable.

Moreover, cooling air flowing inside the body cover as well as running air flowing outside thereof are smoothly moved backwards along the gently bent surfaces. Thus, air resistance is not increased.

Furthermore, various parts including the engine covered with the body cover are exposed sidewards simply by removing the side covers from the front cover. Thus, daily inspection, maintenance and repairing work are very easy to perform.

BEST MODE FOR CARRYING OUT THE INVENTION

Figure 1:
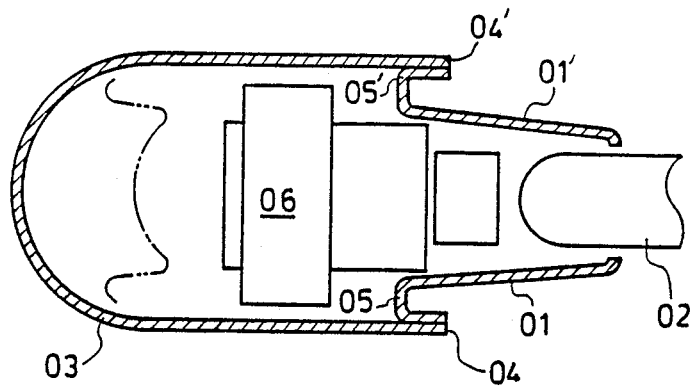
FIG. 1 is a cross sectional view of a conventional body cover for motorcycles.
Figure 2:
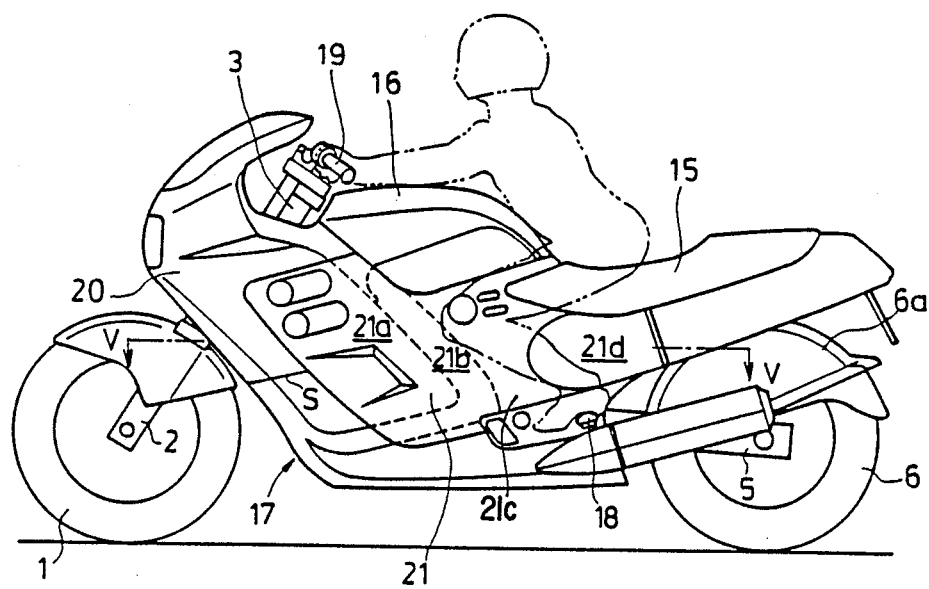
FIG. 2 is a side view of a motorcycle equipped with a body cover according to the present invention.
Figure 3:
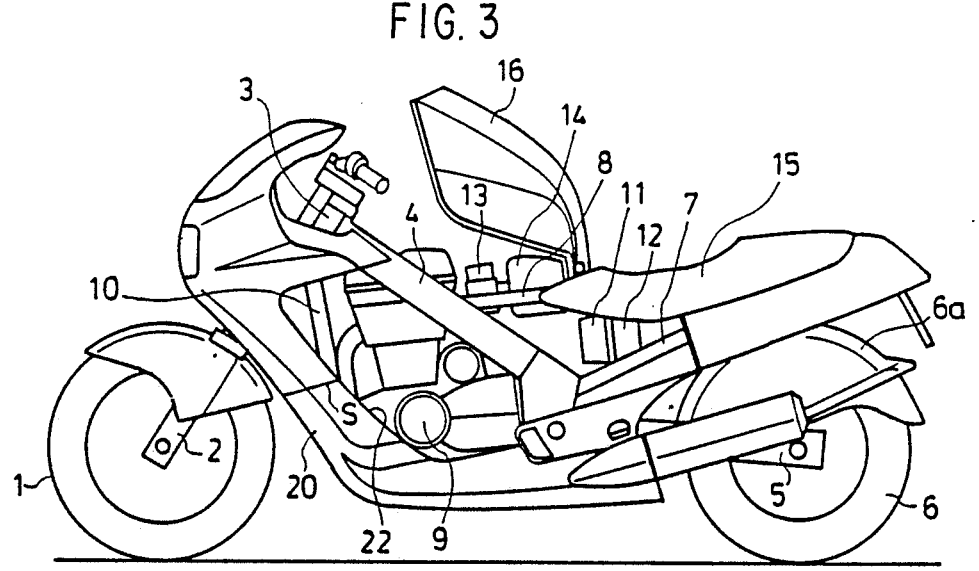
FIG. 3 is a side view of the motorcycle with side covers removed therefrom.

FIGS. 2 through 5 show one embodiment of the present invention. A body frame of the illustrated motorcycle, as shown by FIG. 3, includes a main frame 4 extending backwards from a head pipe 3 pivotably supporting a front wheel 1 through a front fork 2. The main frame 4 is provided with a rear wheel 6 swingably mounted on a rear lower part thereof through a rear fork 5. An upper half part of the rear wheel 6 is covered with a fender 6a mounted on the rear fork 5. A back-stay 7 extends backwards from a rear part of the main frame 4. A rear end of the back-stay 7 and an intermediate part of the main frame 4 are connected together by a seat rail 8. In this way, a body frame comprising main frame 4, back-stay 7, and seat rail 8, is provided with auxiliary equipment such as an engine 9, a radiator 10, a radiator reserve tank 11, a battery 12, a carburetor 13, and an air cleaner 14. A seat 15 is placed on and secured to the seat rail 8. A fuel tank 16 is mounted on a front part of the seat 15 in such a fashion as to cover the head of the engine 9, the carburetor 13, and the air cleaner 14. The fuel tank 16 is pivotally attached at an rear end thereof to the body frame as such that it can be vertically opened and closed.

Figure 5:
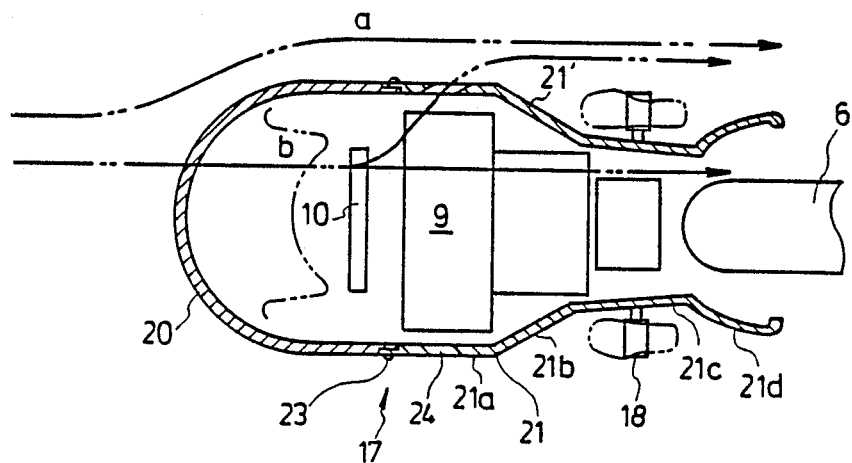
FIG. 5 is a generally sectional view taken along line V—V of FIG. 2.

The width of the body, as shown in FIGS. 2 and 5, is covered at its front part with a body cover 17 from the front to both sides thereof. A rider sits astride the seat 15 with his feet placed on foot rests 18 projecting sidewards from the body and with his knees placed along the outer surfaces of the rear sides of the body cover 17 and operates a handle 19.

The body cover 17 is divided into a front cover 20 and a pair of right and left side covers 21, 21'. The front cover 20, as shown in FIG. 3, covers at its upper part a front part of the handle 19 from the front to both sides thereof, and at its lower part a front part of the engine 9. The lowermost part of the front cover 20 extends backwards close to the rear wheel 6 along both sides of the car body. That is, both sides of the front cover 20 are each provided at a part facing the engine 9 installed at a vertically intermediate position, with an opening 22 which is widely and deeply scooped out from a rear edge to the front thereof. In this embodiment, the front cover 20 is divided into two vertical parts along a separating line S. Alternatively, the front cover 20 may be integrally formed. The front cover 20 is provided at a part thereof positioned in front of the engine 9 with an air inlet port, so that heating portions such as radiator 10 and engine 9 are cooled by running air which flows into the inlet port from the front during the motorcycle is running.

Figure 4:
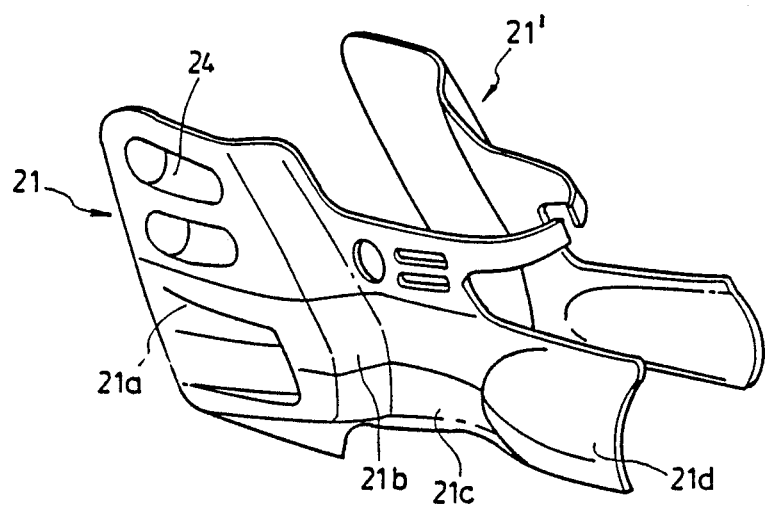
FIG. 4 is a perspective view of the side covers.

The openings 22 of the front cover 20 are covered with the side covers 21 and 21'. The side covers 21 and 21' are secured to the front cover 20 by a bolt 23 (FIG. 5) at the front part of each side cover 21 along the front edge of the opening 22. The front part 21a is formed to extend in the same plane as the front cover 20 and covers the cut-out side opening 22. The right and left side covers 21, 21', as shown in FIG. 4, are symmetric with each other with respect to the central vertical plane of the motorcycle frame body. The width between the side covers 21 and 21' is widest at the front part 21a. Each side cover 21 tapers at an obtuse angle, at a rear part of the front part 21a; that is, an inclined surface 21b gradually slopes at an obtuse angle toward the center line of the body and the intermediate part 21c behind the inclined surface 21b extends backwards under the seat along the side of the body. The width between the right and left intermediate parts 21c is relatively narrow compared with the width between the front parts 21a. Accordingly, a rider can comfortably sit on the seat 15 with his knees placed along the intermediate parts 21c in the manner as described. Furthermore, the part from the intermediate part 21c to the front inclined surface 21b is a smooth outer surface of the side cover 21. Since no unnatural projections such as a bolt, rear edge of the front cover 20, etc. are present at that part, a comfortable riding can be obtained. A rear end of the intermediate part 21c is expanded or formed outwardly in a bulbous part 21d covering the front part of the rear wheel 6 from both sides. The feet of the rider placed on the rests 18, as shown by the dotted line in FIG. 5, are situated in spaces between the inclined surface 21b and the bulbous part 21d. The front part 21a is provided with an air outlet port 24 for releasing a part of the air passed through the radiator 10.

In this way, the sides of the body cover 17 comprising the front part 20 and the side covers 21 and 21' form a smooth continuous outer surface which extends from the front cover 20 continued to the intermediate part 21c via the smooth gradually inclined surfaces 21b. Accordingly, a running air a flowing outside the body cover 17 flows to the rear from the front along the smooth outer surface without being disturbed. As a result, the running resistance is reduced. The inner surface of the body cover 17 is a smooth surface continuously extending from the wide front part to the intermediate part having a comparatively narrow width via the inclined surfaces 21b. Accordingly, a running air b flowing from the front air inlet port cools the engine 9, etc. and thereafter, flows backwards without any resistance, the air being guided by the smooth inner surface. Therefore, a sufficient amount of cooling air can be taken into the body cover 17 through the air inlet port. After passing through the radiator 10, a part the running air b is discharged outside through the air outlet port 24, and the remaining air passes the intermediate parts 21c. Accordingly, notwithstanding of the fact that the width of the intermediate parts is narrow, the flow resistance is small.

Furthermore, the side covers 21 and 21' can be very easily removed from the front cover 20 by removing the bolts 23. When the side covers 21 and 21' are removed, various equipment such as engine 9, radiator 10, radiator reserve tank 11, battery 12, carburetor 13, and air cleaner 14 which are covered with the body cover 17, are exposed sidewards. Therefore, these equipment can be very easily inspected, maintained, repaired and so on.

As described in the foregoing, a body cover for a motorcycle of the present invention comprises a front cover for covering a front part of the motorcycle body frame from the front to both sides thereof and having openings on both sides thereof facing an engine, and right and left covers removably attached to the sides of the front cover and covering the openings. The right and left side covers being gradually bent toward the center line of the body frame from the front toward the rear and then extending to the rear under a seat along the car body. Accordingly, since the parts where the rider's legs abut become smooth surfaces, riding comfort is provided. Moreover, since cooling air flows smoothly along the outer surface of the body cover, the running resistance can be reduced. Similarly, cooling air flowing inside the body cover flows backwards smoothly along the inner surface of the cover to effectively cool heated parts such as the engine. Furthermore, various parts including the engine covered with the body cover are exposed sidewards simply by removing the side covers from the front cover. Thus, the inspection, maintenance and repairing work are very easy to perform.

We claim:

1. A body cover for a motorcycle having a body frame including a head pipe, a main frame member extending rearward from the head pipe, a back stay extending rearward from a rear part of the main frame member, a seat rail mounting a seat and adapted to connect a rear end of the back stay to an intermediate part of the main frame member and an engine and carburetor mounted on the body frame comprising:

a forwardly open front cover extending around and covering a front part of said body frame from the front to a left and a right side thereof, said front cover having an opening at each side thereof with each opening bounded by the front cover at a front edge of said opening and providing access to said engine, a pair of side covers with each side cover having a front edge adapted to be removably attached to one side of said front cover to cover said opening at said one side of said front cover, each of said side covers having a front part adjacent its front edge formed to provide an outer surface which is a smooth continuation of an adjacent outer surface of said front cover, said front part being formed with an air outlet port for exhausting air from inside of said side cover to the outside of said side cover, a second part of said side cover rearward of said front part which forms, at an inner surface thereof, an obtuse angle with an inner surface of said front part, an intermediate part of said side cover, rearward of said second part, angled inwardly relative to said second part to provide foot clearance, and a rear part of said side cover, said intermediate and said rear parts of said side cover extend rearward along one side of the body frame under the seat, whereby each of said side covers extends from a front to a rear of said main frame member and covers one side of the main frame member, back stay and seat rail.

2. The body cover as claimed in claim 1, wherein said rear part of each of said side covers is expanded outward and said intermediate parts of said side covers are the narrowest part of said body cover when said side covers are attached to said front cover.

3. The body cover as defined in claim 2, wherein said front cover comprises an upper part and a lower part, said upper part covers an upper front portion of said body frame, said lower part covers a front part of said engine and extends rearward along both sides of said body frame to a location adjacent a rear wheel, and a foot rest at each side of said body cover, each said foot rest being located near a bottom portion of one of said intermediate parts of said side covers.

* * * * *